US010834176B2

(12) United States Patent
Arya et al.

(10) Patent No.: US 10,834,176 B2
(45) Date of Patent: Nov. 10, 2020

(54) AUTOMATED END-TO-END APPLICATION DEPLOYMENT IN A DATA CENTER

(71) Applicant: The DIRECTV Group, Inc., El Segundo, CA (US)

(72) Inventors: Vishal Arya, Manhattan Beach, CA (US); Christopher Joseph Cugno, Anaheim Hills, CA (US); Shariq Osman, La Mirada, CA (US); Vaibhav Singh, Los Angeles, CA (US)

(73) Assignee: THE DIRECTV GROUP, INC., Atlanta, GA (US)

( * ) Notice: Subject to any disclaimer, the term of this patent is extended or adjusted under 35 U.S.C. 154(b) by 96 days.

(21) Appl. No.: 15/455,919

(22) Filed: Mar. 10, 2017

(65) Prior Publication Data

US 2018/0262559 A1 Sep. 13, 2018

(51) Int. Cl.
*H04L 29/08* (2006.01)
*G06F 16/95* (2019.01)
(Continued)

(52) U.S. Cl.
CPC .......... *H04L 67/1002* (2013.01); *G06F 9/505* (2013.01); *G06F 16/95* (2019.01);
(Continued)

(58) Field of Classification Search
CPC ............. H04L 67/1002; H04L 67/1008; H04L 67/1031; H04L 67/34; G06F 9/505; G06F 16/95
See application file for complete search history.

(56) References Cited

U.S. PATENT DOCUMENTS 7,124,101 B1 10/2006 Mikurak
7,509,369 B1 3/2009 Tormasov
(Continued)

FOREIGN PATENT DOCUMENTS

CA 2470300 A1 12/2004
CN 102404378 A 11/2014
(Continued)

OTHER PUBLICATIONS

Tim Dornemann et al., "On-demand resource provisioning for BPEL workflows using Amazon's elastic compute cloud." Cluster Computing and the Grid, 2009. CCGRID'09. 9th IEEE/ACM International Symposium on. IEEE, May 18, 2009. http://citeseerx.ist.psu.edu/viewdoc/download?doi=10.1.1.151.1729&rep=rep1&type=pdf.
(Continued)

*Primary Examiner* — Jason D Recek

(57) ABSTRACT

In one example, the present disclosure describes a device, computer-readable medium, and method for automating the end-to-end deployment of applications in a data center. For instance, in one example, a set of characteristics is extracted from an electronic signal. The set of characteristics pertains to an application to be deployed in a data center. A load balancer on which to deploy the application is automatically selected, based at least in part on the set of characteristics. A workflow is automatically generated for deployment of the application on the load balancer. The workflow coordinates actions among a plurality of computing resources of the data center that are used to configure the application according to the set of characteristics.

20 Claims, 4 Drawing Sheets

(51) Int. Cl.
*G06F 9/50* (2006.01)
*H04L 29/12* (2006.01)

(52) U.S. Cl.
CPC ...... *H04L 67/1008* (2013.01); *H04L 67/1031* (2013.01); *H04L 67/34* (2013.01); *H04L 61/1511* (2013.01); *H04L 61/2521* (2013.01)

(56) References Cited

U.S. PATENT DOCUMENTS

| | | |
|---|---|---|
| 7,941,556 B2 | 5/2011 | Canali et al. |
| 8,140,624 B2 | 3/2012 | Gingell et al. |
| 8,156,199 B1 | 4/2012 | Hoche-mong et al. |
| 8,296,434 B1 | 10/2012 | Miller et al. |
| 8,756,298 B2 | 6/2014 | Ma et al. |
| 8,782,206 B2 | 7/2014 | Hofmann et al. |
| 8,793,348 B2 | 7/2014 | Ott |
| 9,154,549 B2 | 10/2015 | Sundararaj |
| 9,235,491 B2 | 1/2016 | Kimmet et al. |
| 9,270,745 B2 | 2/2016 | Wee et al. |
| 9,454,406 B2 | 9/2016 | Sabin et al. |
| 9,483,258 B1 | 11/2016 | Labat et al. |
| 2003/0046396 A1 | 3/2003 | Ristock et al. |
| 2005/0149940 A1 | 7/2005 | Calinescu et al. |
| 2007/0208844 A1 | 9/2007 | Armstrong et al. |
| 2010/0228819 A1* | 9/2010 | Wei ............ G06F 9/505 709/203 |
| 2012/0117241 A1* | 5/2012 | Witt ............ H04L 67/00 709/226 |
| 2015/0169291 A1* | 6/2015 | Dube ............ G06F 8/20 717/101 |
| 2015/0341428 A1* | 11/2015 | Chauhan ......... H04L 69/16 709/203 |
| 2015/0378703 A1* | 12/2015 | Govindaraju ........ G06F 8/60 717/174 |
| 2016/0196124 A1 | 7/2016 | Vedula et al. |
| 2016/0323187 A1* | 11/2016 | Guzman ........... H04L 47/125 |
| 2017/0013049 A1* | 1/2017 | Patil ............. H04L 67/1002 |
| 2017/0048148 A1 | 2/2017 | Huang et al. |
| 2018/0157542 A1* | 6/2018 | Savov ............ G06F 9/542 |

FOREIGN PATENT DOCUMENTS

| | | |
|---|---|---|
| CN | 104301415 A | 1/2015 |
| WO | 2017004081 A1 | 1/2017 |

OTHER PUBLICATIONS

Mayanka Katyal et al., "A comparative study of load balancing algorithms in cloud computing environment." arXiv preprint arXiv:1403.6918 (Dec. 2013). https://arxiv.org/ftp/arxiv/papers/1403/1403.6918.pdf.

Vincent C. Emeakaroha et al., "SLA-aware application deployment and resource allocation in clouds." Computer Software and Applications Conference Workshops (COMPSACW), 2011 IEEE 35th Annual. IEEE, Jul. 18, 2011. http://hydra.infosys.tuwien.ac.at/staff/vincent/pub/Emeakaroha_CloudApp2011.pdf.

Gengbin Zheng et al., "Runtime Systems & Tools: Dynamic Load Balancing," Parallel Program Laboratory, warm.cs.uiuc.edu, University of Illinois, Nov. 3, 2012. http://web.archive.org/web/20121103115431/http://charm.cs.uiuc.edu/research/ldbal.

"Google Cloud Load Balancing," Google, cloud.google.com, Jul. 25, 2016. http://web.archive.org/web/20160725235836/https://cloud.google.com/loadbalancing/.

* cited by examiner

AUTOMATED END-TO-END APPLICATION DEPLOYMENT IN A DATA CENTER

The present disclosure relates generally to data centers, and relates more particularly to devices, non-transitory computer-readable media, and methods for automating the deployment of applications in a data center.

BACKGROUND

A data center is a facility that houses computer systems and associated equipment (e.g., telecommunications and storage equipment). For instance, a data center may include the computer systems (e.g., servers) used to support one or more applications, as well as backup power supplies, redundant data communications connections, environmental controls (e.g., air conditioning, fire suppression), and other systems. Portions of a data center may also be virtualized as a pool of cloud infrastructure resources (e.g., computing, memory, storage, bandwidth, etc.) that support one or more applications.

SUMMARY

In one example, the present disclosure describes a device, computer-readable medium, and method for automating the end-to-end deployment of applications in a data center. For instance, in one example, a set of characteristics is extracted from an electronic signal. The set of characteristics pertains to an application to be deployed in a data center. A load balancer on which to deploy the application is automatically selected, based at least in part on the set of characteristics. A workflow is automatically generated for deployment of the application on the load balancer. The workflow coordinates actions among a plurality of computing resources of the data center that are used to configure the application according to the set of characteristics.

In another example, a device includes a processor and a computer-readable medium storing instructions which, when executed by the processor, cause the processor to perform operations. The operations include extracting a set of characteristics from an electronic signal, wherein the set of characteristics pertains to an application to be deployed in a data center, automatically selecting a load balancer on which to deploy the application, based at least in part on the set of characteristics, and automatically generating a workflow for deployment of the application on the load balancer, wherein the workflow coordinates actions among a plurality of computing resources of the data center that are used to configure the application according to the set of characteristics.

In another example an apparatus includes an input device and a processor. The input device is configured to extract a set of characteristics from an electronic signal, wherein the set of characteristics pertains to an application to be deployed in a data center. The processor is configured to automatically select a load balancer on which to deploy the application, based at least in part on the set of characteristics and to automatically generate a workflow for deployment of the application on the load balancer, wherein the workflow coordinates actions among a plurality of computing resources of the data center that are used to configure the application according to the set of characteristics.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides devices, non-transitory computer-readable media, and methods for automating the end-to-end deployment of applications in a data center. As discussed above, a data center may be used to house (or "virtually" house) computer systems and associated equipment for supporting one or more applications (where an application may be used to support a service provided over the Internet, for example). Deployment of an application in a data center is typically a multi-step process that may involve configuration and deployment across multiple different devices and protocols, each of which may serve a different purpose. For instance, deployment of an application may involve the configuration of various parameters such as domain name server (DNS) hostname, virtual Internet Protocol (IP) configurations, firewall rules, protocol profiles, load balancing configuration, and/or deployment of computational resources (virtual and/or physical).

Examples of the present disclosure automate the end-to-end deployment of an application in a data center by automatically (e.g., without user intervention) generating a workflow that coordinates the actions of the different services used to configure the application according to a set of provided characteristics. Examples of the disclosure further include automatically selecting a load balancer on which to deploy the application, based at least in part of the set of provided characteristics. End-to-end automation of the deployment process reduces the effort and complexity required to deploy the application, as well as the time to deploy and launch the application. In one example, a plurality of predefined workflows for deploying different applications are stored, e.g., in a database. In some examples, when an application is to be deployed, a predefined workflow corresponding to a similar application may be used to guide the deployment. The predefined workflow may be modified as necessary to accommodate the specific requirements of the application to be deployed.

Examples of the present disclosure may be used to deploy any application hosted at an Internet-based data center, whether the data center is a physical data center or a virtual one. For instances, examples of the present disclosure may be used to deploy applications that handle services such as authentication, authorization, and access control to end users through the Internet. In one example, the present disclosure may be used to automate at least three different types of application deployments: (1) addition of resources to an existing application; (2) upgrade of an existing application; and (3) addition of a new application. In one example, addition of resources to an existing application may be viewed as a specific type of upgrade to an existing application.

Figure 1:
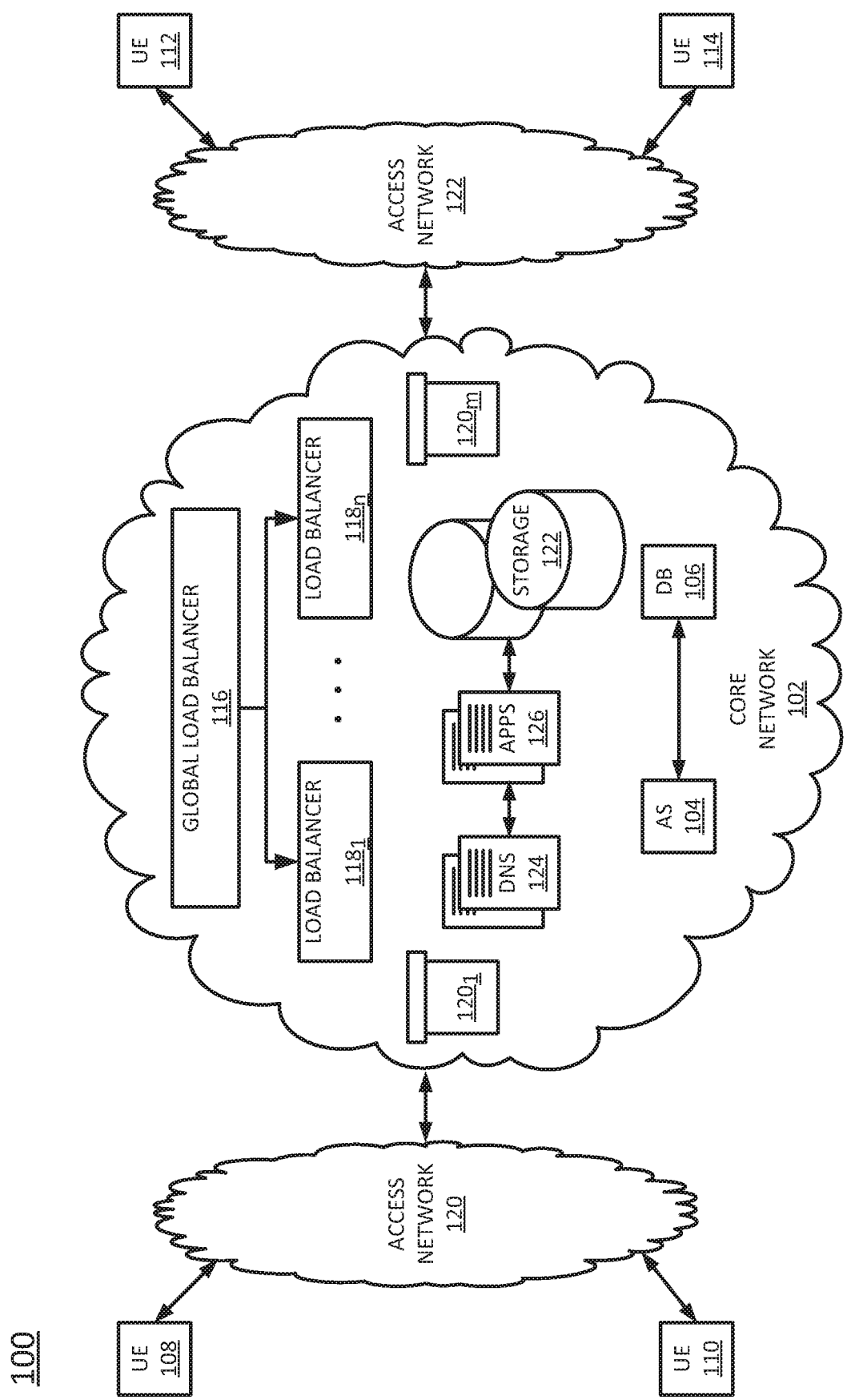
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one example, the core network 102 may include an application server (AS) 104 and a database (DB) 106. Although only a single AS 104 and a single DB 106 are illustrated, it should be noted that any number of application servers 104 or databases 106 may be deployed. In a further example still, the core network 102 may include one or more resources configured as a virtual data center, including a global load balancer 116, a plurality of load balancers $118_1$-$118_n$ (hereinafter collectively referred to as "load balancers 118"), one or more firewalls $120_1$-$120_m$ (hereinafter collectively referred to as "firewalls 120"), storage devices 122, and server farms including domain name system (DNS) servers 124 and application servers 126 (e.g., virtual machines). For ease of illustration, various additional elements of core network 102 are omitted from FIG. 1.

Figure 4:
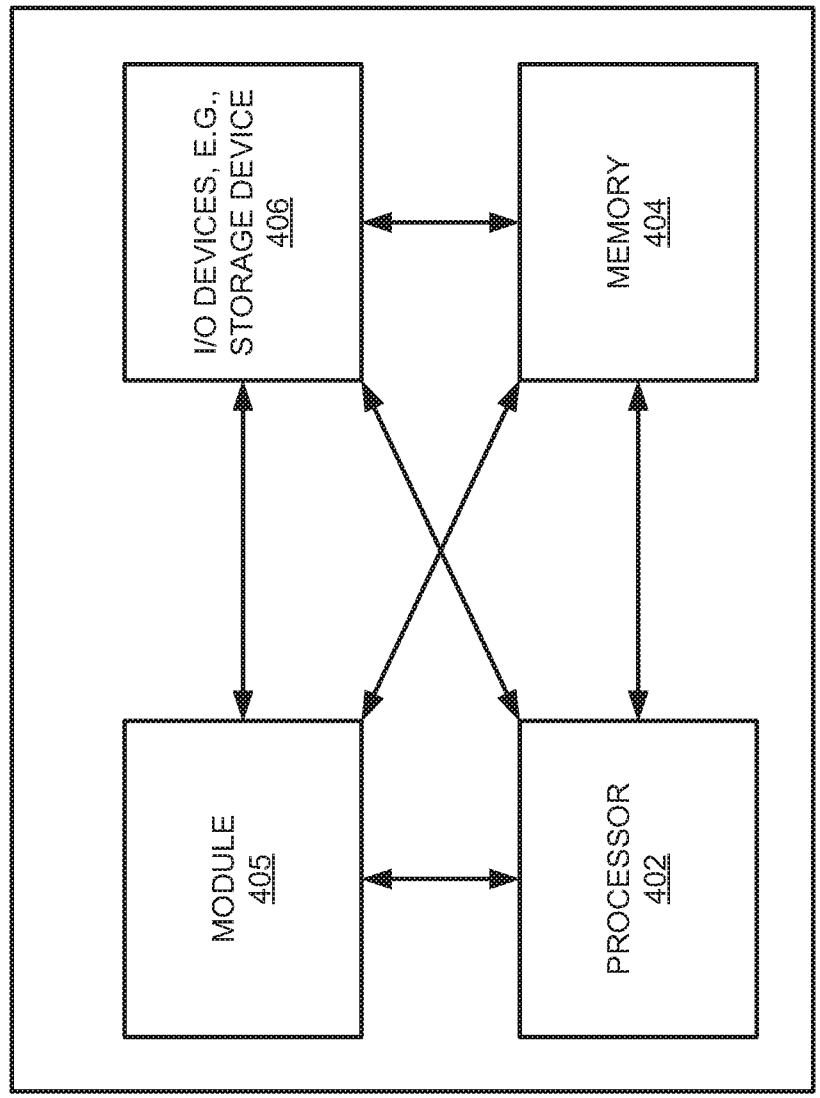
FIG. 4 depicts a high-level block diagram of a computing device specifically programmed to perform the functions described herein.

In one example, the AS 104 may comprise a general purpose computer as illustrated in FIG. 4 and discussed below. In one example, the AS 104 may perform the methods discussed below related to automating the end-to-end deployment of applications in a data center. For instance, in one example, the AS 104 is configured to generate a workflow for deploying an application by coordinating the actions of various other elements of the core network, including the global load balancer 116, load balancers 118, firewalls 120, storage devices 122, DNS servers 124, and/or application servers 126.

In one example, the DB 106 may store data relating to applications that are deployed or about to be deployed in the core network. This data may include various application characteristics discussed in greater detail with respect to FIG. 2. The DB 106 may also store workflows that can be used or adapted to deploy applications, including workflows that were used to deploy existing applications.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 124 and core network 102 relating to communications with web servers, AS 104, and/or other servers via the Internet and/or other networks, and so forth.

In one example, the user endpoint devices 108, 110, 112, and 114 may be any type of subscriber/customer endpoint device configured for wired or wireless communication such as a desktop computer, a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, and the like. In one example, any one or more of the user endpoint devices 108, 110, 112, and 114 may have both cellular and non-cellular access capabilities and may further have wired communication and networking capabilities. It should be noted that although only four user endpoint devices are illustrated in FIG. 1, any number of user endpoint devices may be deployed.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, any one or more of the user endpoint devices 108, 110, 112, and 114 may host an operating system for presenting a user interface that may be used to send data to the AS 104 and for reviewing data sent by the AS 104.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure. Furthermore, in another example, elements of the core network 102 may be implemented as a physical data center, where resources such as the global load balancer 116, load balancers 118, storage devices 122, DNS servers 124, and application servers 126 are implemented in physical form rather than virtual form.

Figure 2:
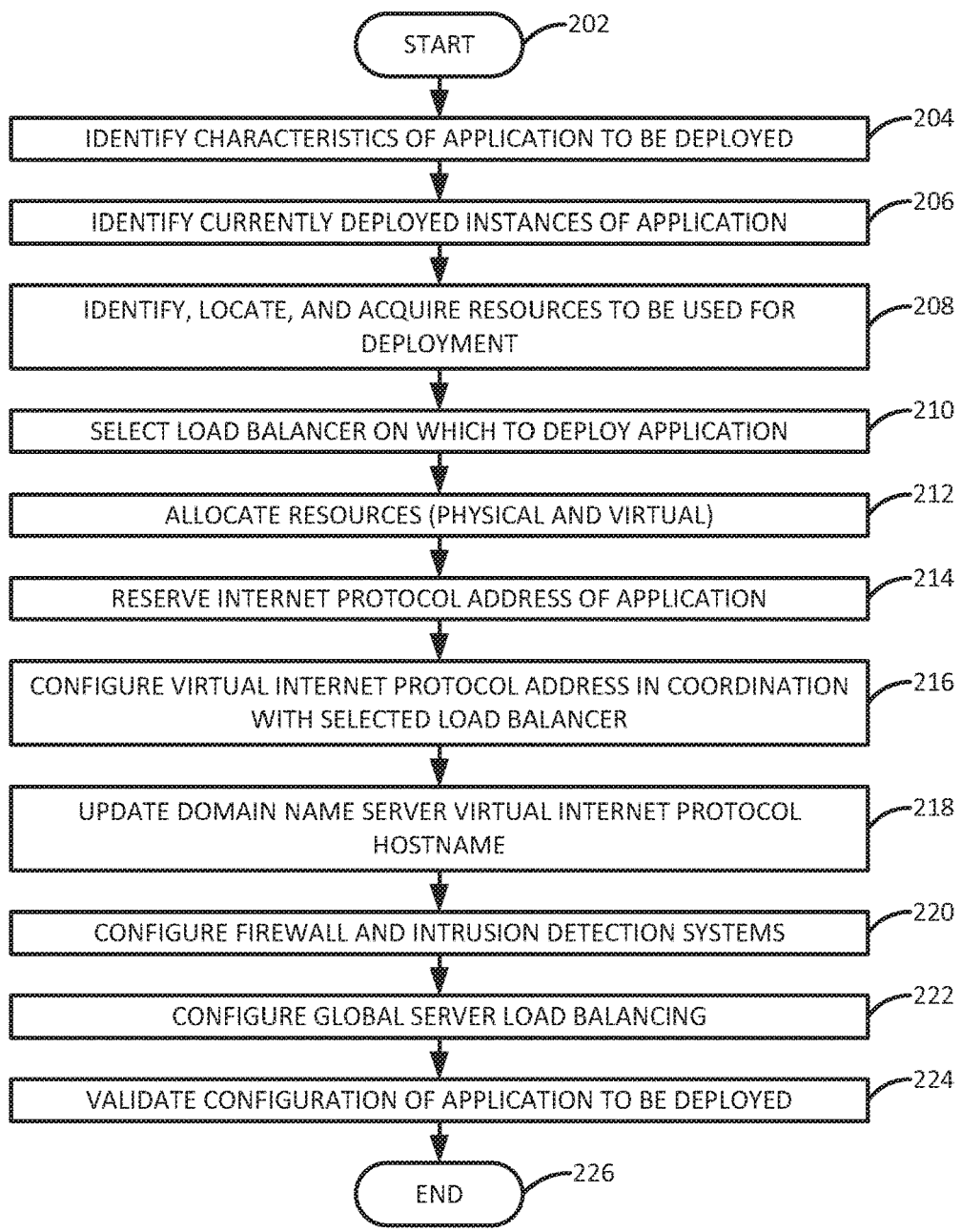
FIG. 2 illustrates a flowchart of an example method for deploying an application in a data center

To further aid in understanding the present disclosure, FIG. 2 illustrates a flowchart of an example method 200 for deploying an application in a data center. In one example, the method 200 may be performed by an application server such as the AS 104 illustrated in FIG. 1. However, in other examples, the method 200 may be performed by another device. As such, any references in the discussion of the method 200 to the AS 104 of FIG. 1 are not intended to limit the means by which the method 200 may be performed. In one example, an abstraction layer which sits on top of all deployment environments serves as an entry point to the method 200. The abstraction layer ensures that all information required for configuration and deployment of the application has been obtained, that the devices requires to carry out the configuration and deployment are in sync with this information, that the devices are configured in the correct order, and that the final configuration is valid (i.e., will enable deployment of the application as intended).

The method 200 begins in step 202. In step 204, a set of characteristics pertaining to the application to be deployed are identified. For instance, a human operator may supply the characteristics (e.g., via manual input) to an application that will generate a workflow for the deployment process. As such, the characteristics may be extracted from an electronic signal. In one example the application characteristics include one or more of the following: virtual Internet Protocol (VIP) hostname (e.g., hostname(s) used to reach the VIP address over a domain name server), pool name (e.g., a load balancer parameter that tracks the physical and virtual resources allocated to a VIP), VIP type (e.g., a load balancer parameter tracking the type of VIP being configured), VIP address/port (e.g., a load balancer parameter that associates the VIP to the actual ports used), source (src) address (e.g., a firewall parameter that secures the entry point into the data center by defining the origin of the incoming data flow), protocol profile (e.g., a firewall parameter that tracks the protocols that need to be allowed into the data center), Hypertext Transfer Protocol (HTTP) profile (e.g., parameter used to set up world wide web access by the application), secure socket layer (SSL) profile (e.g., parameter used to track information required to secure sessions over the Internet), persistence profile (e.g., parameter used to ensure that the same resource is used every time the same client logs in to the application), health monitors (e.g., parameter used to verify the availability and current health of the different resources deployed with the application), source network address translation (SNAT) pool (e.g., parameter used to translate public resources into private resources, for security and scaling), and load balancer specific rules (e.g., other parameters used by load balancers and firewalls to direct traffic to the correct resources. Other application characteristics may also be supplied, including the type of deployment (e.g., addition of new application, upgrade of existing application, or addition of resources to existing application) or deployment environment (e.g., physical, virtual, or a combination of both).

In step 206, currently deployed instances of the application to be deployed are identified. In the event that the deployment type is the addition of a new application, there will be no currently deployed instances to be identified. However, in the event that the deployment type is either the upgrade of an existing application or the addition of resources to an existing application, there will be at least one currently deployed instance to be identified.

In step 208, a set of data center computing resources to be used in the deployment of the application are identified, located, and acquired. The resources may be physical, virtual, or a combination of the two. In the event that the deployment type is the upgrade of an existing application, there may be no resources to be identified, located, and acquired. However, in the event that the deployment type is either the addition of a new application or the addition of resources to an existing application, there will be resources to be identified, located, and acquired.

In step 210, a load balancer is automatically identified (e.g., without user guidance) for the deployment of the application. The particular load balancer to use may depend on one or both of the characteristics of the application and on the type of deployment. In one example, if the deployment type is the upgrade of an existing application or the addition of resources to an existing application, then the load balancer on which the existing application is deployed is selected for deployment of the upgrade or the addition of resources. In another example, if the deployment type is the addition of a new application, then an existing application to which the new application is most similar is identified, and the new application is deployed on the same load balancer as the most similar existing application. In yet another example, if the deployment type is the addition of a new application, but there are no existing applications that are similar to the new application, then the load balancer that is most suited for the new application's characteristics (e.g., using virtualized resources versus physical resources, etc.) is selected got deployment of the new application.

In step 212, the resources that were identified, located, and acquired in step 208 are allocated to the application. This step may involve coordination with virtual machine hypervisors and/or human operators who may manually allocate all or some of the resources.

In step 214, the Internet Protocol (IP) address associated with the application is reserved. This step may involve coordination with DNS servers and/or IP address management (IPAM) tools.

Figure 3:
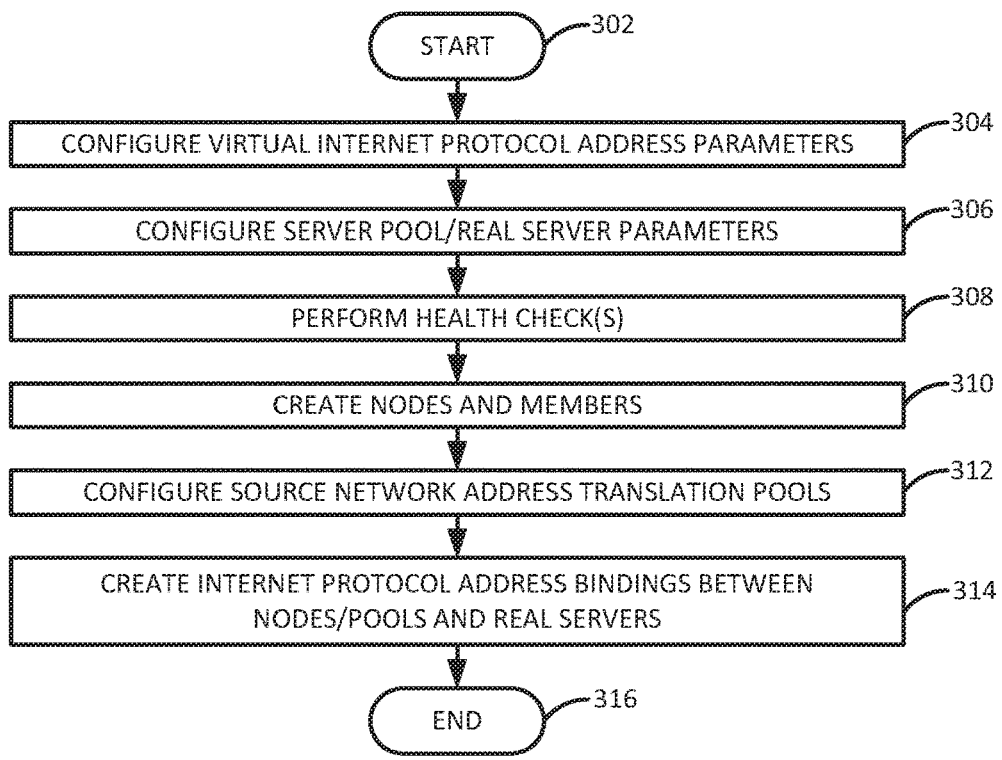
FIG. 3 illustrates a flowchart of an example method for configuring a load balancer for deployment of an application.

In step 216, the Virtual IP (VIP) address associated with the application is configured. This step may involve coordination with the load balancer(s) selected in step 210. FIG. 3 illustrates one example of a method for configuring a selected load balancer, including configuration of the VIP address parameters, in more detail.

In step 218, the domain name server (DNS) VIP hostname associated with the application is updated. This step may involve coordination with DNS servers and/or IPAM tools.

In step 220, the firewall(s) and intrusion detection system(s) (IDS) associated with the application are configured. This step may involve coordination with network security devices and/or network security applications.

In step 222, the global server load balancers associated with the application are configured. This step may involve coordination with global server load balancers.

In step 224, the configuration of the application is validated.

The method 200 ends in step 226.

It should be noted that some steps of the method 200 may be performed in tandem. For instance, the allocation of computational resources (e.g., as described in connection with step 212) may be performed at the same time that the load balancer is selected (e.g., as described in connection with step 210).

FIG. 3 illustrates a flowchart of an example method 300 for configuring a load balancer for deployment of an application. The method 300 may be implemented, for example, in conjunction with step 216 of the method 200. In one example, the method 200 may be performed by an application server such as the AS 104 illustrated in FIG. 1. However, in other examples, the method 300 may be performed by another device. As such, any references in the discussion of the method 300 to the AS 104 of FIG. 1 are not intended to limit the means by which the method 300 may be performed. The method makes use of various application characteristics identified in step 204 of the method 200.

The method 300 begins in step 302. In step 304, the parameters of the application's VIP address are configured in coordination with the selected load balancer. In one example, the parameters to be configured include at least one of: VIP hostname, VIP type, or VIP Internet Protocol address (e.g., port).

In step 306, the parameters of the pool(s) associated with the load balancer is configured, along with the parameters of the physical server associated with the application. In one example, the pool parameters to be configured include at least the pool name(s). In one example, the parameters of the physical server include at least the source address.

In step 308, one or more health checks are performed. In one example, the health checks verify the availability and current health of the different resources deployed with the application, e.g., by checking one or more health monitors.

In step 310, nodes and members are created according to the application characteristics. In one example, the nodes and members are created using one or more of the following parameters associated with the application: protocol profile, HTTP profile, SSL profile, or persistence profile. In some cases, no nodes or members will be created depending on the application characteristics.

In step 312, one or more SNAT pools are configured, e.g., using one or more of the application characteristics identified in step 204 of the method 200.

In step 314, IP address bindings are created between any nodes created in step 310 the physical server(s) associated with the application and the associated VIP addresses. Bindings may also be created between and the pools configured in step 306 and the physical servers. In one example, these bindings are created using the VIP address associated with the application. In a further example, load balancing methods and rules associated with the selected load balancer may also be involved in the creation of the bindings.

The method 300 ends in step 316.

Although not expressly specified above, one or more steps of the methods 200 or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the methods 200 or 300 may be implemented as the system 400. For instance, an application server (such as might be used to perform the methods 200 or 300) could be implemented as illustrated in FIG. 4.

As depicted in FIG. 4, the system 400 comprises a hardware processor element 402, a memory 404, a module 405 for generating a workflow for application deployment, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for generating a workflow for application deployment may include circuitry and/or logic for performing special purpose functions relating to the deploying an application in a physical and/or virtual data center. The input/output devices 406 may include, for example, storage devices (including but not limited to, a tape drive, a floppy drive, a hard disk drive or a compact disk drive), a receiver, a transmitter, a display, an output port, and/or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for generating a workflow for application deployment (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for generating a workflow for application deployment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
    extracting, by a processing system including at least one processor, a set of characteristics from an electronic signal, wherein the set of characteristics pertains to an application to be deployed in a data center;
    automatically selecting, by the processing system, a deployed load balancer on which to deploy the application, based at least in part on the set of characteristics, wherein the deployed load balancer is of a first type of load balancer of a plurality of types of load balancers, wherein the first type of load balancer is associated with at least a portion of the set of characteristics, wherein the at least the portion of the set of characteristics includes a usage of virtualized resources by the application, wherein the first type of load balancer is associated with the usage of virtualized resources by the application, and wherein a second type of load balancer of the plurality of types of load balancers is associated with a usage of non-virtualized resources by other applications; and
    automatically generating, by the processing system, a workflow for deployment of the application on the deployed load balancer, wherein the workflow coordinates actions among a plurality of computing resources of the data center that are used to configure the application according to the set of characteristics.

2. The method of claim 1, wherein the application is an existing application, and the deployment involves upgrading the existing application.

3. The method of claim 2, wherein the upgrading involves adding resources to the existing application.

4. The method of claim 2, wherein the deployed load balancer is a load balancer on which the existing application is deployed.

5. The method of claim 1, wherein the application is a new application that is not yet deployed.

6. The method of claim 5, wherein the deployed load balancer is a load balancer on which an existing application is deployed, and the existing application is similar to the new application based on the set of characteristics that pertains to the application.

7. The method of claim 1, wherein an abstraction layer that sits on top of a deployment environment serves as an entry point to the method.

8. The method of claim 1, wherein the plurality of computing resources comprises a virtual resource.

9. The method of claim 1, wherein the plurality of computing resources comprises a physical resource.

10. The method of claim 1, wherein the workflow comprises:
    reserving an internet protocol address associated with the application.

11. The method of claim 1, wherein the workflow comprises:
    configuring a virtual internet protocol address associated with the application.

12. The method of claim 1, wherein the workflow comprises:
    updating a domain name server associated with the application.

13. The method of claim 1, wherein the workflow comprises:
    configuring an intrusion detection system associated with the application.

14. The method of claim 1, wherein the workflow comprises:
    configuring a global server load balancer associated with the application.

15. A device, comprising:
    a processor; and
    a computer-readable medium storing instructions which, when executed by the processor, cause the processor to perform operations, the operations comprising:
        extracting a set of characteristics from an electronic signal, wherein the set of characteristics pertains to an application to be deployed in a data center;
        automatically selecting a deployed load balancer on which to deploy the application, based at least in part on the set of characteristics, wherein the deployed load balancer is of a first type of load balancer of a plurality of types of load balancers, wherein the first type of load balancer is associated with at least a portion of the set of characteristics, wherein the at least the portion of the set of characteristics includes a usage of virtualized resources by the application, wherein the first type of load balancer is associated with the usage of virtualized resources by the application, and wherein a second type of load balancer of the plurality of types of load balancers is associated with a usage of non-virtualized resources by other applications; and
        automatically generating a workflow for deployment of the application on the deployed load balancer, wherein the workflow coordinates actions among a plurality of computing resources of the data center that are used to configure the application according to the set of characteristics.

16. The device of claim 15, wherein an abstraction layer that sits on top of a deployment environment serves as an entry point to the operations.

17. The device of claim 15, wherein the plurality of computing resources comprises a virtual resource.

18. The device of claim 15, wherein the plurality of computing resources comprises a physical resource.

19. An apparatus, comprising:

an input device to extract a set of characteristics from an electronic signal, wherein the set of characteristics pertains to an application to be deployed in a data center; and a processor to automatically select a deployed load balancer on which to deploy the application, based at least in part on the set of characteristics, wherein the deployed load balancer is of a first type of load balancer of a plurality of types of load balancers, wherein the first type of load balancer is associated with at least a portion of the set of characteristics, wherein the at least the portion of the set of characteristics includes a usage of virtualized resources by the application, wherein the first type of load balancer is associated with the usage of virtualized resources by the application, and wherein a second type of load balancer of the plurality of types of load balancers is associated with a usage of non-virtualized resources by other applications, and to automatically generate a workflow for deployment of the application on the deployed load balancer, wherein the workflow coordinates actions among a plurality of computing resources of the data center that are used to configure the application according to the set of characteristics.

20. The apparatus of claim 19, wherein the plurality of computing resources comprises a virtual resource.

\* \* \* \* \*